United States Patent
Bayes et al.

(10) Patent No.: US 7,269,796 B1
(45) Date of Patent: Sep. 11, 2007

(54) METHOD FOR INFRASTRUCTURE QUICK VIEW

(75) Inventors: Jason N. Bayes, Lakeland, FL (US); Muthaya M. Cheranda, Duluth, GA (US); Hossein Eslambolchi, Los Altos Hills, CA (US); Christopher Rollin Giles, Auburn, AL (US); Harold Jeffrey Stewart, Alpharetta, GA (US)

(73) Assignee: AT&T Corp., New York, NY (US)

( * ) Notice: Subject to any disclaimer, the term of this patent is extended or adjusted under 35 U.S.C. 154(b) by 931 days.

(21) Appl. No.: 10/423,268

(22) Filed: Apr. 25, 2003

(51) Int. Cl.
*G06F 13/00* (2006.01)
*G06F 15/00* (2006.01)

(52) U.S. Cl. ........................ 715/766; 715/738; 715/736

(58) Field of Classification Search ................ 715/855, 715/854, 853, 736, 738, 851, 764, 766, 763
See application file for complete search history.

(56) References Cited

U.S. PATENT DOCUMENTS

| | | | | |
|---|---|---|---|---|
| 6,665,676 B2* | 12/2003 | Twig et al. | ................... | 707/10 |
| 2001/0035885 A1* | 11/2001 | Iron et al. | ................... | 345/855 |
| 2002/0065691 A1* | 5/2002 | Twig et al. | ................... | 705/7 |

* cited by examiner

*Primary Examiner*—Cao (Kevin) Nguyen

(57) ABSTRACT

In accordance with the teachings of the present invention, a method is presented for viewing information acquired from an integrated network. A plurality of modules (client/server methods) is used by an end user to access information in the integrated network. The information is accessed from databases distributed across the network. A client/server method (i.e., module) utilizes a key to search for information across distributed databases. The information is then returned to the client for viewing in a window based on the mode selected for viewing. For example, the information may be viewed as text in information mode, as images in photo mode, as images in CAD mode, or as a video in video mode.

7 Claims, 6 Drawing Sheets

METHOD FOR INFRASTRUCTURE QUICK VIEW

BACKGROUND OF THE INVENTION

1. Field of the Invention

This invention relates to information systems. Specifically, the present invention relates to information access across disparate systems.

2. Description of the Prior Art

Modern communication networks are integrated and often include a wide variety of computer and communication technologies. For example, a conventional network may include a variety of computers running different software. Initially, these computers were deployed in a single location; but with the advancement of networks, computer and communication devices from disparate locations were connected for communication. For example, the Internet may be considered an integrated communication network.

Modern communication networks are typically integrated with a variety of computer and communication devices. The computer and communication devices typically transmit information over a variety of media types, such as twisted pair media, coaxial cables, fiber optic cables, or even air. These networks are often implemented with a variety of sub-networks, such as circuit-switched networks, packet-switched networks, and wireless networks. Initially, the Internet and the Department of Defense networks were the only large-scale networks of this type. However, as computer and communication technologies advanced and became more ubiquitous, both small and large companies began implementing large integrated networks.

These integrated networks enable companies to operate by facilitating information processing, such as information storage, information exchange, information management, etc. The information processed in these networks takes a variety of different formats. For example, it is commonplace to transmit text, voice, images, or video across a network. Further, it is commonplace to store the information in different media, such as tape media, optical media, etc.

Initially, the ability to process different types of information in a network was a significant advancement. However, as the variety of components in a network increased, a need developed to integrate the information. Therefore, information systems that provided integrated access to different networks were developed. However, although these information systems provided access from a single entry point, they did not provide a means of consolidating the information resident in the different networks. Without integration, an end user may exhaust a tremendous amount of time accessing each of the disparate systems and then consolidating the information.

For example, a multi-national company may operate a large network. Suppose that the network includes a first database connected to a wireless network and running under a first operating system. Suppose the first database stores information on French employees. Suppose the network also includes a second database connected to a circuit-switched network and running under a second operating system. Suppose the second database stores information on American employees. With conventional technology, an employee from the human resources department may be able to query both databases from their computer (i.e., single access point) to access information on the French employees and the American employees. However, in a conventional network, these databases are typically different databases and have different access procedures. Therefore, the human resources employee may have to connect and log-on to the first database and then query the first database in a specified format to get the information about the French employees. The human resources employee may then have to log-off of the first database and then log-on to the second database to access information about the American employees. Although the human resources employee can access these disparate systems from a single access point, as the variety of databases increases, the time required to access the required information will increase. Further, as the number of systems increase and the complexity of the systems increase, the expertise of the human resources employee will have to increase to enable him/her to access these systems. In addition, some business operations require that the information is accessed within a limited amount of time. For example, suppose that the two databases store flight information. An air traffic controller would need to access this information quickly. The inability to quickly access this information may have very serious consequences.

Thus, there is a need for a method of accessing information across disparate systems. There is a need for a method of facilitating quick and easy access to information stored in disparate systems. There is a need for a method that consolidates information stored in disparate systems for presentation to an end user.

SUMMARY OF THE INVENTION

A method for processing information stored in an integrated network is presented. A module consists of a client/server process that enables a user to acquire information from the integrated network. The module consists of a process on a client that launches methods operating on a server. In one embodiment of the present invention, modules concurrently operate within the network and enable an end user to access different types of information from disparate systems. For example, a building module enables the end user to acquire building information from the integrated network. As a result, the building module acquires information on buildings by accessing disparate systems and searching across various databases that store building information.

A client process is presented. The client process initiates methods on a server. The methods access disparate systems and acquire a superset of information from the disparate systems. The client process also requests a subset of the information and then displays the subset of the information in a graphical user interface (GUI) on the client.

A GUI operates on the client. The GUI includes windows and toolbars for implementing the method of the present invention. The GUI includes a map window for displaying a map, which includes a plurality of objects, and a map toolbar for operating the map window. The GUI also includes a system toolbar for selecting a method on the server. Once a method is selected using the system toolbar and an object is selected from the map, the server acquires a superset of information. A quick view toolbar and a quick view window are also provided in the GUI. The quick view toolbar includes a number of icons (i.e., selectable options). Selecting an option from the toolbar causes the server to communicate a subset of the information to the client. The client then displays the subset of information in the quick view window.

A server process is presented. The server process receives initial information from the client, which causes the server to select a method. The server also processes information transmitted from the client, which causes the server to use the selected method to acquire information from disparate systems. Lastly, the server processes information from the client, which identifies a subset of the information. The subset of the information is then communicated back to the client for display.

In one embodiment of the present invention, the quick view window operations are independent of the module operations. In addition, the quick view window defaults to the information mode. In another embodiment, the quick view window includes predefined database paths and queries that are implemented based on the type of object selected on the map.

A method comprises the steps of generating method selection information, the method selection information identifying a method of operating a server; generating object selection information, the object selection information causing the server to acquire a superset of information associated with the object selection information; generating view mode information, the view mode information causing the server to communicate a subset of the superset of information; and displaying the subset of the superset of information in a window.

A graphical user interface comprises a map window displaying a map, the map including a plurality of objects, where selecting an object causes a server to operate a method and acquire a superset of information; a quick view toolbar including a plurality of icons, at least one of the plurality of icons generating a request to the server, which causes the server to identify a subset of the superset of information; and a quick view window capable of displaying the subset of the superset of information.

A method of operating a server comprises the steps of receiving method selection information; receiving key information; receiving view mode information; operating a method, in response to the method selection information, in response to the key information, and in response to the view mode information, the method causing a plurality of systems to operate and acquire a superset of information associated with the key information; and defining a subset of information in response to the view mode information and in response to the superset of information associated with the key information.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

An integrated network, which includes a client displaying a graphical user interface (GUI), a server, and a variety of databases, is presented. The server implements a plurality of different methods for acquiring data (i.e., information) from the databases in the integrated network. A process initiated on the client launches each method. The combination of the process on the client and the method for acquiring data resident in the server is considered a module (i.e., client/server method). An end user interacts with the integrated network by operating the modules. In one embodiment of the present invention, the integrated network includes a large number and variety of modules. For example, illustrative modules include modules that provide network information about buildings, cables, human resources, alarms, power consumption, etc. A key enables the end user to identify a specific object (i.e., building, cable segment, etc.) irrespective of the module that the end user is operating.

A method for viewing information across modules is presented. The method removes the need to independently operate each module to view information generated by the module. The method is referred to as a quick view method. In addition, the information acquired using the quick view method is displayed in a window. As a result, the window is referred to as a quick view window. The quick view window displays information in several modes (i.e., quick view modes), such as kiosk mode, information mode, video mode, Computer Aided Design (CAD) mode, photo mode, locate-my-position mode, next mode, and previous mode. The mode (i.e., quick view mode) of operation determines how information is formatted and displayed in the quick view window.

In accordance with the teachings of the present invention, during operation, by selecting an object (i.e., providing a key), a user is able to work across the different modules and acquire information associated with the object (i.e., key). Then based on the mode of operation selected for the quick view window, the information is formatted and displayed in the quick view window.

Figure 1:
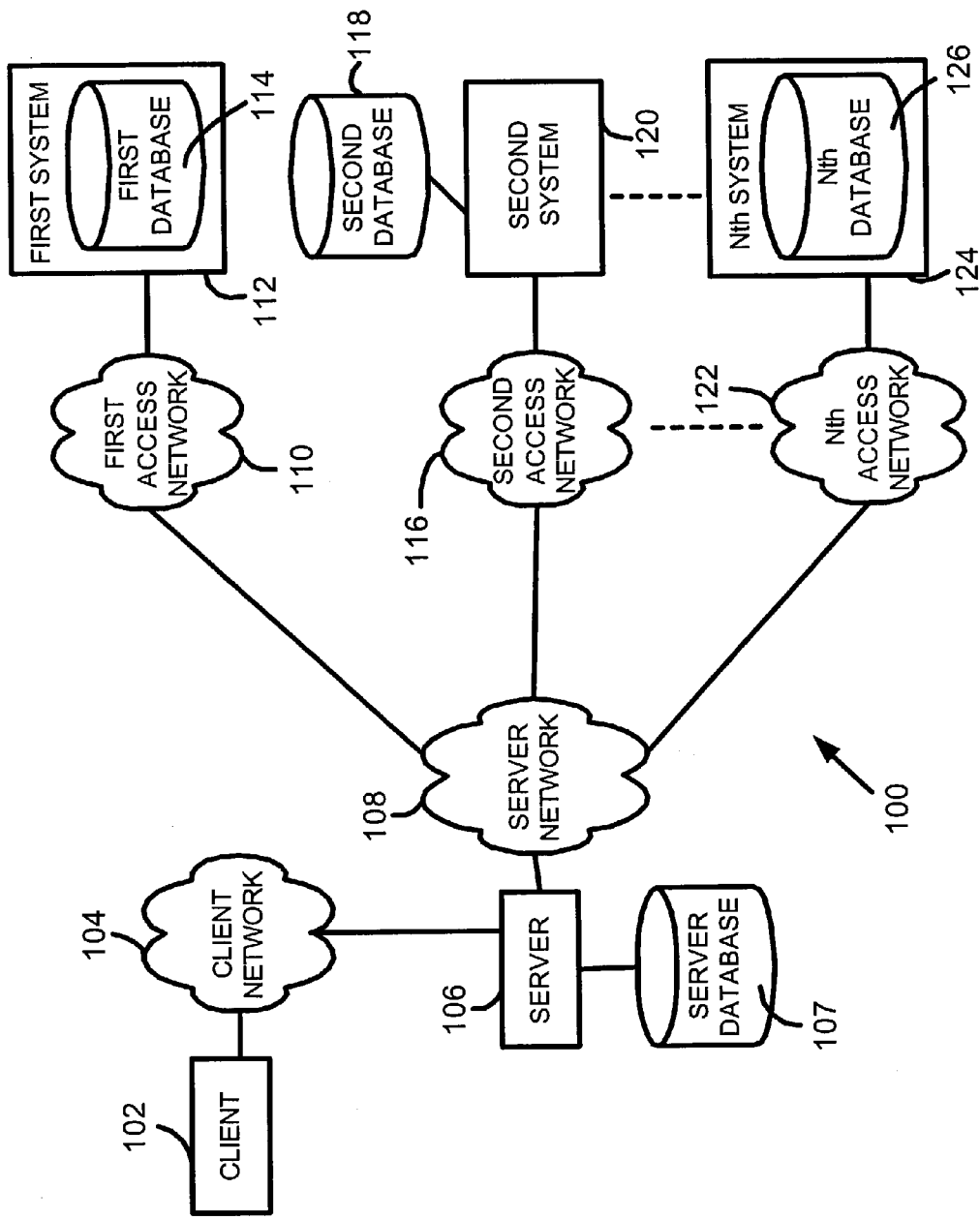
FIG. 1 displays a network implementing the teachings of the present invention.

FIG. 1 displays an integrated network 100 implementing the method of the present invention. In FIG. 1, a client 102 is shown. The client 102 is connected to a server 106 through a client network 104. The client 102 may be implemented with a computer architecture, such as a multi-function computer, a laptop computer, a handheld computer, a Personal Data Assistant (PDA), etc. In one embodiment of the present invention, the server 106 may also be implemented with a multi-function computer. The client network 104 may provide a direct connection between the client 102 and the server 106. In the alternative, the client network 104 may be a Local Area Network (LAN), a Wide Area Network (WAN), a wireless network, a packet network, or some other type of network suitable for communicating information between the client 102 and the server 106.

The server 106 is connected to a server network 108. The server network 108 is connected to a first access network 110, a second access network 116, and an Nth access network 122 (i.e., where an Nth access network may include any number of networks). Each of the networks (i.e., server network 108, the first access network 110, the second access network 116, and the Nth access network 122) may be implemented with a variety of technologies. For example, each network may be implemented with circuit-switched technology, packet-switched technology, asynchronous transfer mode (ATM) technology, wireless technology, optical technology, etc. In an alternative embodiment of the present invention, server network 108, first access network 110, second access network 116, and Nth access network 122 may be implemented as a single network.

The first access network 110 provides access to a first system 112, which is associated with a first database 114. The second access network 116 provides access to a second system 120, which is associated with a second database 118. The Nth access network 122 provides access to an Nth system 124, which is associated with an Nth database 126.

First system 112, second system 120, and Nth system 124 may each be a separate system implementing a variety of technologies. For example, first system 112 may be a Global Positioning System (GPS) system storing location information. Second system 120 may be a computer system storing human resources information. The Nth system 124 may be a data acquisition system acquiring data from various locations in the integrated network 100. It should be appreciated that first system 112, second system 120, and Nth system 124 represent any system capable of processing (i.e., acquiring, managing, storing, transmitting, analyzing, etc.) information.

First database 114, second database 118, and Nth database 126 may store a variety of different types of data. For example, first database 114 may store text data in a flat file. Second database 118 may store digital voice data in a relational database. Nth database 126 may store video data in a relational database after the video data has been acquired with data acquisition equipment. In one embodiment of the present invention, the databases (114, 118, 126) use a proprietary protocol and access method. Therefore, each database may require a unique method for accessing the database. In an alternative embodiment, each database may operate according to a standardized protocol or access method, such as Structured Query Language (SQL).

During operation of the integrated network 100, the client 102 makes a request. The request is communicated across the client network 104 to the server 106. The server 106 operates methods based on the request. The server 106 generates a server request. The server request traverses the server network 108, the first access network 110, the second access network 116, and the Nth access network 122. As such, the first database 114, the second database 118, and the Nth database 126 located in the first system 112, the second system 120, and the Nth system 124, respectively, may be queried for data. The requested data may be located in any one of the databases (i.e., 107, 114, 118, or 126) and once the requested data is located, the data is formatted and sent back across the appropriate access network (i.e., 110, 116, 122). The data then traverses the server network 108 to the server 106. The server 106 forwards the requested data across the client network 104 to the client 102.

In one embodiment of the present invention, the integrated network 100 is an integrated communication network storing network and personnel information for a network operating company or another company with a large network infrastructure. For example, assume that the client 102 is implemented with a computer including a monitor. The monitor displays a GUI, such as a web browser. An end user may interface with the integrated network 100 through the web browser. For example, by selecting a Universal Resource Locator (URL) link in the web browser, the client 102 initiates communication across the client network 104 to the server 106 where a server method (i.e., computer instructions, software) operates. Running a method on the server 106 by performing initiating activity on the client 102 is one method of operating a module.

The combination of the methods stored on the client 102 and the methods launched on the server 106 forms a module in the integrated network 100. Each module performs various tasks and functions. For example, the client 102 may display a map of the United States. The map may include objects, such as buildings, communications equipment, cable connections, human resources, etc. Each object on the map is associated with at least one unique identifier known as a key. The key is used throughout the integrated network 100 to identify information associated with an object. Selecting an object on the map initiates an event. For example, selecting a specific object, such as a building, identifies the key associated with the building and then transmits that key to the server 106. A method is then run on the server 106 to collect information associated with the key and return that information back to the client 102 for display in the GUI. For example, selecting a building object may launch an event to search several databases using a key associated with the object to identify the information associated with the building object.

A variety of methods are implemented in the integrated network 100. For example, there are methods associated with buildings, communications equipment, cable connections, human resources, etc. Methods are stored on the server 106 and may be initiated through a GUI running on the client 102. In one embodiment of the present invention, the integrated network 100 may represent the Internet. Internet technologies, such as Transmission Control Protocol/Internet Protocol (TCP/IP), Hypertext Transfer Protocol (HTTP), Extensible Markup Language (XML), Hypertext Markup Language (HTML), Common Gateway Interface (CGI), and Active Server Pages may be implemented. As such, the client 102 may generate a request such as an HTTP get request, which initiates a method running on the server 106. The server 106 processes the request using Active Server Pages technology and the server 106 communicates the acquired data with an HTTP response.

The server 106 communicates through a variety of networks (i.e., 108, 110, 116, 122) to access a variety of databases (i.e., 107, 114, 118, 126) associated with a variety of systems (i.e., 112, 120, 124). In one embodiment of the present invention, the databases store database information associated with the operation of a communication network. For example, the database information may include building information, such as the address of each building in the network, the equipment in each building, the technicians that service the building, the owner of the building, photographs of the building, videos of the building, etc. The databases may store information on the communication devices in the network, such as the type of communication device, the interfaces in a communication device, the configuration of a communication device, etc. The databases may store information on the human resources associated with a building, such as the technicians associated with each building, the contact information for operating personnel, the contact information for emergency personnel, the different pieces of communication equipment that the personnel are certified to operate, etc.

The server 106 acquires the information in two ways. First, information may be pushed from the databases (i.e., server database 107, first database 114, second database 118, Nth database 126) to the server 106. In the alternative, the server 106 may poll the various databases for information (i.e., pulls information).

Figure 2:
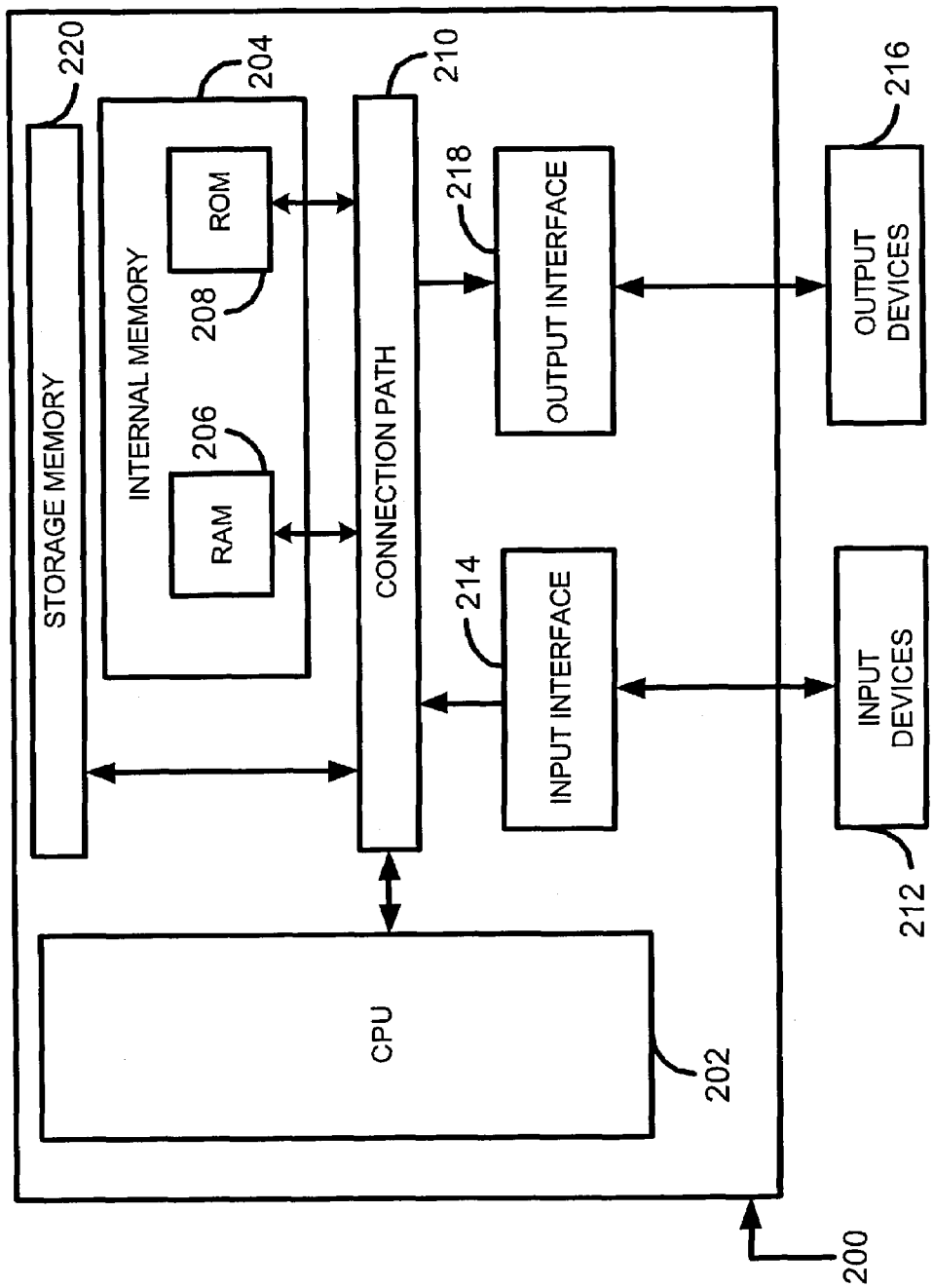
FIG. 2 displays a block diagram of a computer implemented in accordance with the teachings of the present invention.

FIG. 2 is a block diagram of a computer 200 implemented in accordance with the teachings of the present invention. Client 102, server 106, first system 112, second system 120, and Nth system 124 may each be implemented with a computer 200. A central processing unit (CPU) 202 functions as the brain of the computer 200. Internal memory 204 is shown. The internal memory 204 includes short-term memory 206 and long-term memory 208. The short-term memory 206 may be Random Access Memory (RAM) or a memory cache used for staging information. The long-term memory 208 may be a Read Only Memory (ROM) or an alternative form of memory used for storing information. A storage memory, such as a hard drive, is shown as 220. The computer 200 uses a connection path 210 to control the access and retrieval of information from short-term memory 206 and long-term memory 208. In addition, the connection path 210 may be connected to interfaces, which communicate information out of the computer 200 or receive information into the computer 200.

Input devices, such as tactile input devices, joysticks, keyboards, microphones, communication connections, or a mouse, are shown as 212. The input devices 212 interface with the system through an input interface 214. Output devices, such as a monitor, speakers, communications connections, etc., are shown as 216. The output devices 216 communicate with the computer 200 through an output interface 218. In one embodiment of the present invention, the output device 216 is a monitor that is used to display a GUI.

Figure 3B:
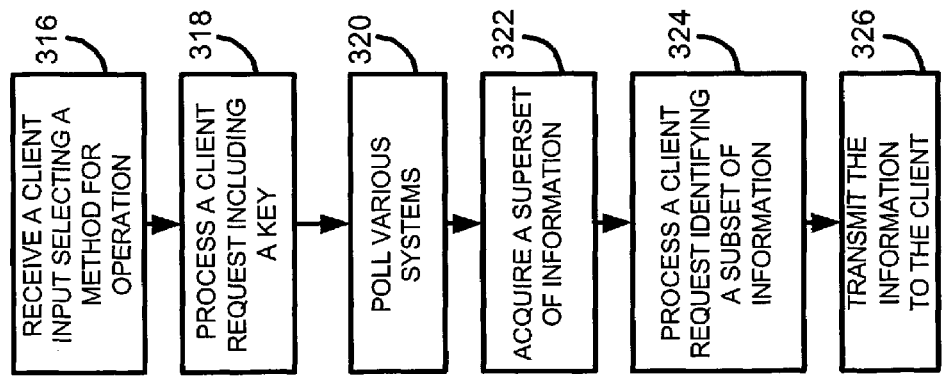
FIG. 3B displays a flow diagram of a server method operating in accordance with the teachings of the present invention.
Figure 3A:
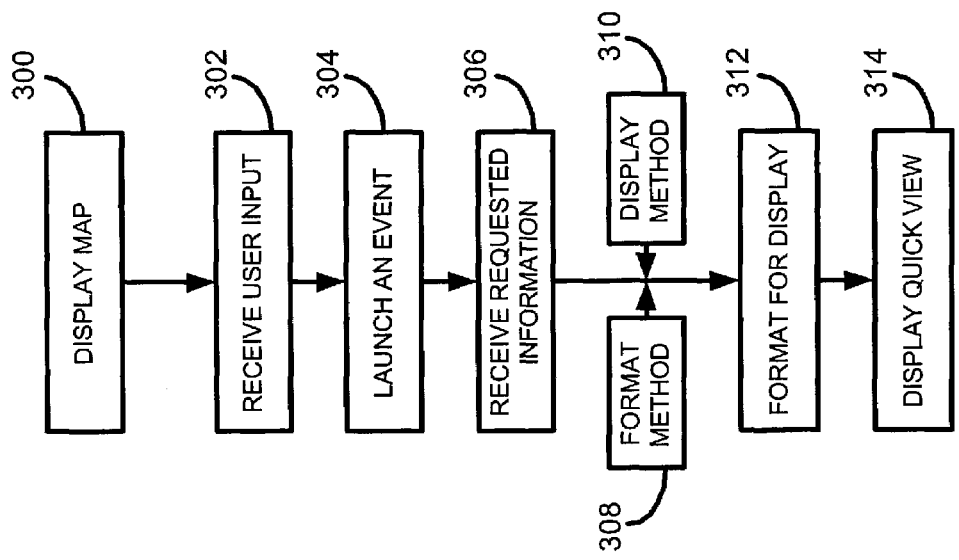
FIG. 3A displays a flow diagram of a client method operating in accordance with the teachings of the present invention.

FIG. 3A displays a method implemented in the client 102 of FIG. 1. The client 102 displays a map using a GUI as shown at 300. At 302, the client 102 receives a user input. The user input may be generated using a variety of techniques. In one embodiment of the present invention, directing a cursor to a specific location on the map and selecting an object with the cursor generates the user input. As shown at 304, when the user input is received, the client 102 launches an event.

In addition to selecting an object (i.e., specific location) on the map, a user also selects a quick view mode of operating. In one embodiment of the present invention, the quick view mode of operating includes an information mode, a photograph (i.e., photo, image) mode, a video mode, a CAD mode, and a locate my position mode. The event generates a request to a server, such as the server 106 of FIG. 1. At 306, the client 102 receives the requested information back from the server 106. Depending on the quick view mode that the client 102 is operating under, a format method 308 is used in conjunction with a display method 310 and information is formatted for display as stated at 312. The format method 308 may include any method of formatting the requested information for display. For example, if the user is in video mode and the user selects a segment on the map, then since the user in video mode, the quick view method will display a page that has already been preformatted to display video information. Likewise, if the user is in AutoCAD mode, then the quick view method displays a web page that is preformatted to display AutoCAD information. Each mode has separate preformatted pages that are ready for display depending on the quick view mode operating at the time. The display method 310 includes methods required to display the requested information. For example, in the case where the requested information is video information, the display method 310 may include the method implemented by third party software to display the video in the GUI. Lastly, after the information has been formatted for display, the information is displayed in a quick view window as stated at 314.

Each of the quick view modes has a code used to call and display a web page that already has control information in the web page associated with the quick view mode of operation. Selecting an object in the map generates a key. The key is passed to the web page that will be displayed in the quick view window. Based on the key and the mode of operation, the quick view method accesses web pages (i.e., XML, HTML, CGI) that enable the display of information associated with the key passed to the quick view method. In other words, the key associated with the selected object is passed into a web page that has already been predefined for a specific quick view mode of operation and for a specific key. A database look up is performed to see what AutoCAD drawings or building photos are mapped to that key and then those images are displayed in the quick view window.

FIG. 3B displays a flow diagram of a method running on a server, such as the server 106 of FIG. 1. The server 106 receives information from the client 102, such as a client selection, which selects one method for operation on the server 106 as stated at 316. The server 106 may then receive and process a client request as stated at 318. Processing a client request may include operating the identified method based on a key. For example, selecting an object in the map (i.e., displayed in the GUI) generates the client request. The client request includes a key. The key associates information with the selected object (i.e., a building, a cable, specific personnel, etc.).

The server 106 performs a variety of methods which use the key to search the storage units in the integrated network 100 of FIG. 1. For example, the server 106 may first search databases connected to the server (i.e., 106 of FIG. 1) to determine if the requested data is stored in those databases. In the alternative, the server 106 may poll several network databases (i.e., 114, 118, 126 of FIG. 1) as shown at 320. Whether the information is pushed to the server 106 or the server 106 polls various systems for the information, a superset of information is acquired in the server 106 as stated at 322. For example, if a building was selected on the map, a superset of information may include all information associated with the building, such as pictures of the building, video of the building, human resources associated with the building, etc. Selecting a quick view mode of operation generates a request, which causes the client 102 to identify a subset of the information for transmission from the server 106 as stated at 324. For example, if the video mode is selected in the quick view window, then the server 106 communicates the video information on the building to the client 102 as stated at 326.

Figure 4:
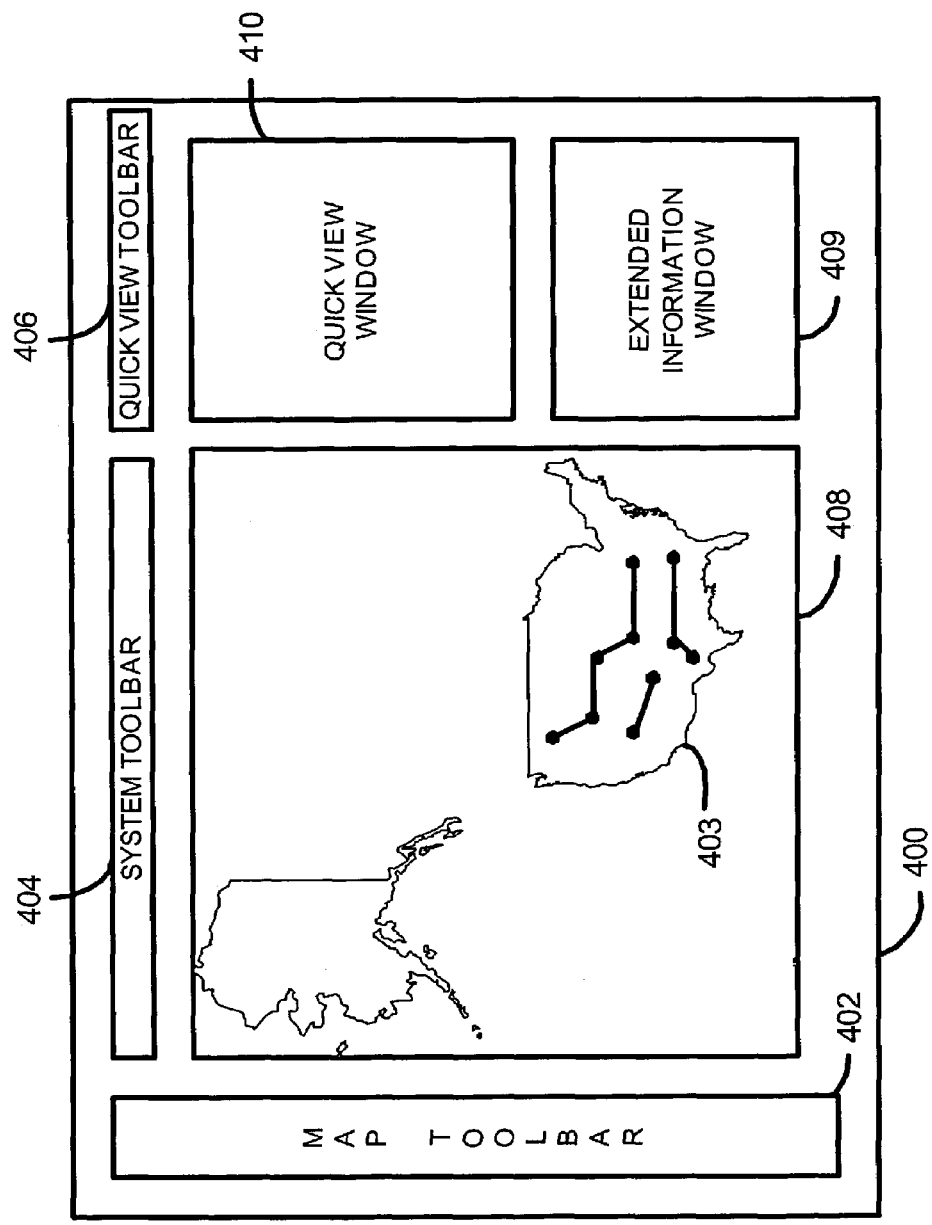
FIG. 4 displays a graphical user interface (GUI) implemented in accordance with the teachings of the present invention.

FIG. 4 displays a GUI 400 implemented in accordance with one embodiment of the present invention. When a user logs into the integrated network 100, through client 102 of FIG. 1, a map 403 is displayed in a map display window 408. The map 403 serves as a GUI interface for the integrated network 100 of FIG. 1. Objects (i.e., buildings, cable segment, human resources, computer equipment, etc.) on the map 403 are tied to client/server processes (i.e., modules) which involve different parts of the integrated network 100 of FIG. 1. For example, selecting a cable segment on the map 403 may operate the cable segment module and initiate a query of the cable segment system and the database associated with the cable segment system. For example, the second system 120 of FIG. 1 may represent the cable segment system and the second database 118 may represent the cable segment database.

In addition, in one embodiment of the present invention, a system toolbar 404 is displayed horizontally along the top of the GUI 400. The system toolbar 404 includes icons used to select a module. Selecting a module in the system toolbar 404 causes the server 106 to identify a specific method to operate. A map toolbar 402 and a map display window 408 are shown. A map 403 is displayed in the map display window 408. The map toolbar 402 is used to operate the map display window 408. For example, the map toolbar 402 may include icons (i.e., selection options) to control the map display window 408 by zooming in on the map 403, zooming out on the map 403, panning across the map 403, etc.

A quick view window 410 is displayed and a quick view toolbar 406 is displayed. It should be appreciated that any of the toolbars or windows may be positioned in a different location in the GUI and still remain within the scope of the present invention.

The quick view window 410 interacts with the integrated network 100 of FIG. 1 through the map 403. Whenever a user selects an object on the map 403, an event passes information (i.e., a key) about the selected object to the quick view window 410. The quick view window 410 will display information depending on the item selected and the current quick view mode of operation.

In one embodiment of the present invention, the quick view toolbar 406 includes eight icons (not shown), which enable eight modes (i.e., view modes) of operating the quick view window 410. The eight icons include a kiosk window icon, a building/segment icon, a photograph icon, a video icon, a CAD icon, a locate-my-position icon, a previous icon, and a next icon. The kiosk window icon is used to launch a photograph (i.e., image), video, or CAD drawing that is being displayed in the quick view window 410 in a separate kiosk window.

The building/segment icon is used to show the building and segment information for the selected object on the map 403. When the building/segment icon is selected, the quick view window 410 is placed in information mode. Also, when a user launches the GUI and enters the integrated network 100 of FIG. 1, the user is defaulted into the information mode of the quick view window 410. In information mode, modules operate to display text information about an object selected on the map 403. Since the integrated network system may cater to a variety of organizations (i.e., both internal and external), information mode is adaptable to each object selected on the map 403. As a result, depending on the object selected, different information about the object is presented in the quick view window 410. For example, if a building is selected, information, such as the location of the building, the key identification number of the building, the address of the building, etc., may be displayed. If a cable segment is selected, information, such as the starting and ending points of the cable, the sheath mileage of the cable, the optical mileage of the cable, fibers in the cable, spare fibers in the cable, ownership of the cable, etc., are shown in the quick view window 410.

In addition, when building objects are selected, additional information is displayed in an extended information window 409. For example, information on network elements, building attributes, people, risk attributes, power plant summary, switching summary, signaling summary, network summary, transport summary, in-service capacity summary, etc. may be displayed. When a segment or cable is selected, information, such as line code information, cable type information, and people information, may be displayed in the extended information window 409 in addition to the information discussed above. The extended information window provides a quick view of additional information that a user can obtain from the integrated network.

The photograph icon is used to show a building photograph of a selected building object. Selecting the photograph icon places the quick view window 410 into photo mode. To access the photograph mode, a user selects the building photograph icon on the quick view toolbar 406. When an object is selected on the map 403 and the user is in photograph mode, building images will be displayed inside the quick view window 410. Some objects relate to a key, which is associated with multiple images. A user can select the previous or next icon buttons to traverse the various images. The kiosk window is another feature that is available in the photo mode. Selecting the kiosk icon while in photo mode displays a kiosk window. Using the kiosk window, the user can expand what is shown in the quick view window 410 into a separate window that is bigger and has its own toolbar that provides additional functionality to the user.

The video window is used to display video for a selected cable segment (i.e., object). Selecting the video icon puts the quick view window 410 in video mode. In video mode, when a user clicks on a segment or a piece of cable, a video showing a camera panning over the region of the cable is displayed. As such, a user can see the groundcover above the cable and the path that the cable follows.

The CAD icon is used to display CAD drawings for a selected building or cable segment object. Selecting the CAD icon puts the quick view window 410 into CAD mode. The integrated network 100 of FIG. 1 includes numerous drawings of different buildings including office drawings, floor plan drawings, etc.; and if a cable segment is selected or the cables that run though the selected building are joined together in the building (i.e., junction splice), then CAD drawings of the cable segment and/or junction splice drawings may be viewed in CAD mode. The previous and next icons may also be used in CAD mode. Therefore, if there is more than one drawing to be viewed, the previous and next icons (i.e., buttons) are available to cycle through the drawings. Also, when the kiosk window icon is selected while in CAD mode, a kiosk window may be launched showing the CAD drawing. As stated earlier, each kiosk window has its own toolbar and functionality.

The locate-my-position icon is used to help an end user identify where they are located on the map 403. As a user operates the GUI to zoom in and out on the map 403, pan around the map 403, etc., the user might lose their orientation and position on the map 403. When the user clicks the locate-my-position icon, the map 403 will start with a high level view of the world and give a small slideshow with each slide displaying a closer view of the map 403 and showing the user his/her placement on the map 403. The previous and next icons are used when in photo or CAD mode. The previous and next icons enable a user to navigate through photos or CAD drawings of a selected object.

Figure 5:
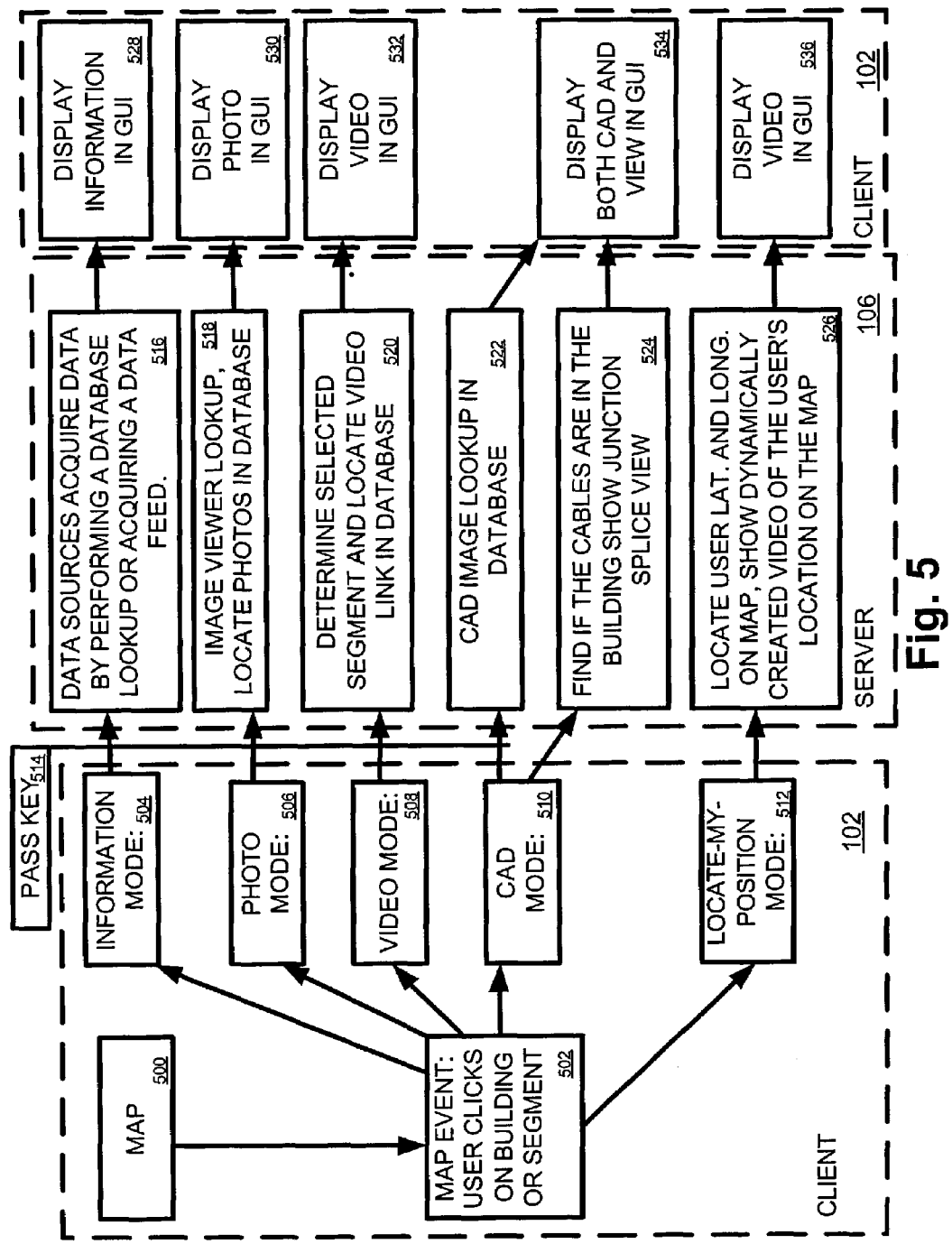
FIG. 5 displays a flow diagram of a client/server method implemented in accordance with the teachings of the present invention.

FIG. 5 displays a client/server method implemented in accordance with the teachings of the present invention. FIG. 4 will be discussed in conjunction with FIG. 5. In FIG. 5, a map is displayed on client 102 as stated at 500. At 502, a user selects an object on the map 500, such as a building or a segment. Selecting a building or a segment initiates an event. The selected object as well as the current operating mode of the quick view window 410 of FIG. 4 are used to display a quick view window 410. For example, the quick view window 410 may be operating in information mode as stated at 504, in photo mode as stated at 506, in video mode as stated at 508, in CAD mode as stated at 510, or in locate-my-position mode as stated at 512. Irrespective of the operating mode of the quick view window 410, selecting a specific building or a segment identifies a key. The operating mode of the quick view window 410 and the key (i.e., 514) are passed to the server 106.

When the quick view window 410 is in information mode as stated at 504, the server 106 performs a lookup on a database (i.e., SQL databases) or receives a data feed (i.e., File Transfer Protocol) based on the key of the selected object as stated at 516. The key 514 is used to identify information or attributes associated with the object (i.e., the building or segment) selected from the map 500. The information is then returned from the server 106 to the client 102 and displayed in the GUI as stated at 528. When the quick view window 410 is in the photo mode as stated at 506, the key 514 and the mode of operation are transferred to the server 106. The server 106 performs a lookup through various databases in the integrated network as stated at 518 to locate photos associated with the key 514. Once the photos are found, they are transmitted back to the client 102 as stated at 530. When the quick view window 410 is in video mode as stated at 508, video mode selection information and a key 514 are passed to the server 106. As a result, the server 106 searches based on the selected segment and locates a video link in a database in the integrated network 100 as stated at 520. Once a video link is located and retrieved, the server 106 transmits the video link to the client 102 where the video information is displayed in a GUI as stated at 532.

When the quick view window 410 is in the CAD mode as stated at 510, a key 514 and quick view window information (i.e., CAD mode) are communicated to a server 106. A CAD image lookup is performed as stated at 522. In addition, in the CAD mode 510, the server 106 performs a search based on the key 514 associated with a selected cable segment to determine if the cables in the building are connected (i.e., have a junction splice) as stated at 524. If there is a CAD view and a junction splice view, the client 102 displays an image associated with each view as stated at 534. In the case where the quick view window 410 is in the locate-my-position mode as stated at 512, information is communicated to the server 106 based on selection of the locate-my-position icon running on client 102. The server 106 locates the users latitude and longitude position on the map 500 and shows a dynamically created video of the user's location as stated at 526. The dynamically created view is ultimately displayed in the GUI as stated at 536.

Figure 6:
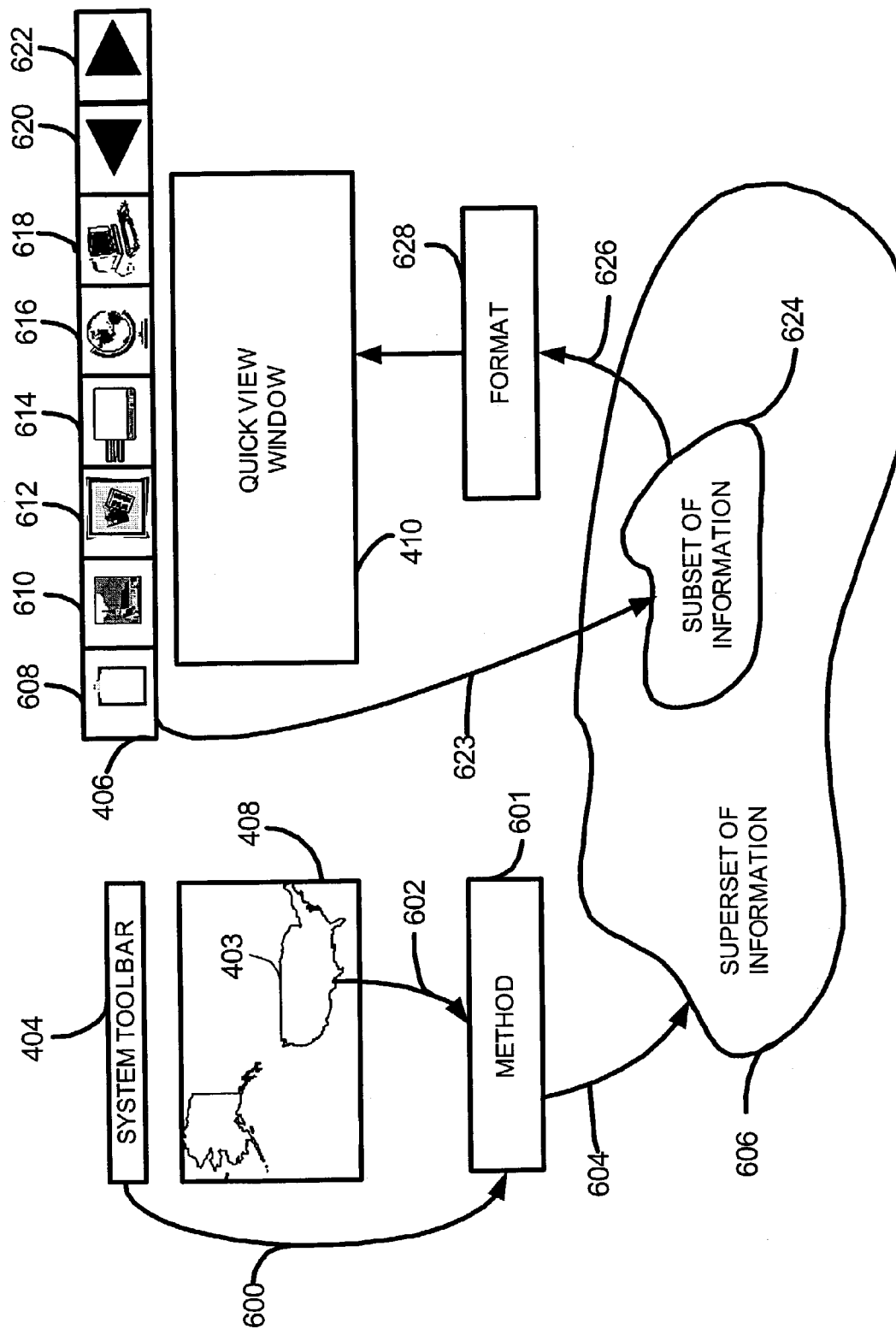
FIG. 6 displays a flow diagram model implemented in accordance with the teachings of the present invention.

FIG. 6 displays a conceptual model highlighting the teachings of the present invention. The map 403, the system toolbar 404, the quick view toolbar 406, and the map display window 408 are shown. Specific icons are detailed in the quick view toolbar 406. For example, the kiosk window icon 608, the building/segment icon 610, the photographs icon 612, the video icon 614, the CAD icon 616, a locate-my-position icon 618, a previous icon 620, and a next icon 622 are shown. Quick view window 410 is also shown.

An icon is selected on the system toolbar 404. Choosing an icon in the system toolbar 404 communicates information 600, which selects a method 601. The method 601 may be a power method, alarm method, etc. The method 601 acquires information 600 from disparate systems within the network. In one embodiment of the present invention, the method 601 operates on the server 106 of FIG. 1. In addition, selecting an object on the map 403 transmits a key 602 to the method 601. The key 602 identifies the specific object (i.e., building) that the method 601 will acquire information on. The method 601 sends out request 604 among disparate systems to acquire a superset of information 606. For example, if the key 602 is associated with a building, the superset of information 606 may include all the information about the building. Once the superset of information 606 is acquired, the superset of information 606 may be staged and stored for future access.

A quick view mode of operation is defined by selecting a quick view icon (i.e., 608, 610, 612, 614, 616, 618, 620, 622). Selecting a quick view mode of operation launches a query 623 from the client 102, which identifies a subset of information 624 for viewing. For example, if the video icon 614 is selected, the subset of information 624 includes videos of the selected object (i.e., building). The subset of information 624 is communicated in a response 626 (i.e., HTTP response, XML, etc.). Routines that may be resident in the client 102 are selected because the video icon 614 was selected. The routines format 628 the subset of information 624 for display in a quick view window 410. For example, the routines (i.e., XML, HTML, CGI) format 628 video information for display in a web page shown in the quick view window 410. In addition, if another icon is selected, the superset of information 606 is accessed to acquire another subset of information 624. For example, in CAD mode, the CAD drawings associated with the building would be acquired from the superset of information 606. The subset of information 624 of CAD drawings would then be formatted 628 for display in the quick view window 410.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

It is, therefore, intended by the appended claims to cover any and all such applications, modifications, and embodiments within the scope of the present invention.

What is claimed is:

1. A method of viewing information within a window of a graphical user interface (GUI), said information acquired from an integrated network comprising a plurality of disparate systems storing information in different formats and on different media, the method comprising the steps of:
   generating method selection information, the method selection information identifying a method of operating a server coupled to the integrated network;
   generating object selection information, the object selection information including a key;
   acquiring a superset of information, based on the key, from the plurality of disparate systems through the server, the superset of information associated with the object selection information and existing in a plurality of different formats as associated with the plurality of disparate systems;
   generating view mode information defining the format in which the information is to be viewed;
   retrieving, based on the view mode information, a subset of the superset of information that exists in the defined format; and
   displaying the retrieved subset of the superset of information in a window within the GUI.

2. A method as set forth in claim 1, wherein the step of generating method selection information includes acquiring network-related information from the plurality of disparate systems in the integrated network.

3. A method as forth in claim 1, wherein the step of generating method selection information includes initiating a method on the server, which operates the plurality of disparate systems to acquire information based upon the key.

4. A method as set forth in claim 1, wherein the subset of the superset of information is formatted for display in the window using a preformatted web page accessed in response to the generated view mode information.

5. A method as set forth in claim 1, wherein the method selection information is generated by selecting an icon in a system toolbar.

6. A method as set forth in claim 1, wherein the step of generating object selection information utilizes a hypertext transfer protocol request to transmit the information to the server.

7. A method as set forth in claim 1, wherein the step of displaying the retrieved subset of the superset of information includes formatting the subset of the superset of information using scripts that generate hypertext markup language.

* * * * *